(12) United States Patent
Roseman et al.

(10) Patent No.: US 9,176,970 B2
(45) Date of Patent: Nov. 3, 2015

(54) PROCESSING ELECTRONIC MESSAGES

(71) Applicant: SaneBox, Inc., Boston, MA (US)

(72) Inventors: Stuart Roseman, Boston, MA (US);
Kristoffer Lange, Saugus, MA (US);
Jason Gloudon, Southfield, MI (US);
Jason Yanowitz, Evanston, IL (US);
Peter Kovacs, Waxhaw, NC (US)

(73) Assignee: SaneBox, Inc., Boston, MA (US)

(*) Notice: Subject to any disclaimer, the term of this patent is extended or adjusted under 35 U.S.C. 154(b) by 175 days.

(21) Appl. No.: 13/968,680

(22) Filed: Aug. 16, 2013

(65) Prior Publication Data

US 2015/0052177 A1 Feb. 19, 2015

(51) Int. Cl.
*G06F 17/30* (2006.01)
*G06Q 10/10* (2012.01)

(52) U.S. Cl.
CPC ........ *G06F 17/30115* (2013.01); *G06Q 10/107* (2013.01)

(58) Field of Classification Search
CPC .................................................. G06F 17/30115
See application file for complete search history.

(56) References Cited

U.S. PATENT DOCUMENTS

| | | | |
|---|---|---|---|
| 5,377,354 A | 12/1994 | Scannell | |
| 5,999,932 A | 12/1999 | Paul | |
| 6,023,723 A | 2/2000 | McCormick | |
| 6,161,130 A | 12/2000 | Horvitz | |
| 6,421,709 B1 | 7/2002 | McCormick | |
| 7,290,033 B1 | 10/2007 | Goldman | |
| 7,539,699 B2 | 5/2009 | Kobashikawa | |
| 7,587,461 B2 | 9/2009 | Baluja | |
| 7,617,286 B2 | 11/2009 | Goldman | |
| 7,945,633 B2 | 5/2011 | Goldman | |
| 8,095,612 B2 | 1/2012 | Cowan | |
| 8,307,038 B2 | 11/2012 | Gillum | |
| 8,312,096 B2 | 11/2012 | Cohen | |
| 8,346,875 B2 | 1/2013 | Gillai | |
| 2003/0187937 A1* | 10/2003 | Yao | H04L 12/585 709/206 |
| 2003/0231207 A1 | 12/2003 | Huang | |
| 2004/0019651 A1* | 1/2004 | Andaker | H04L 51/12 709/207 |
| 2004/0255122 A1* | 12/2004 | Ingerman | G06Q 10/107 713/176 |
| 2005/0065906 A1* | 3/2005 | Romero | G06Q 10/107 707/999.001 |
| 2006/0235933 A1 | 10/2006 | Baluja | |
| 2007/0179945 A1* | 8/2007 | Marston | G06Q 10/107 707/999.005 |
| 2008/0126496 A1 | 5/2008 | Warren | |
| 2012/0215861 A1* | 8/2012 | Smith | G06Q 10/107 709/206 |
| 2013/0166657 A1 | 6/2013 | Tadayon | |
| 2014/0164528 A1* | 6/2014 | Kleppmann | H04L 67/2804 709/206 |
| 2014/0280624 A1* | 9/2014 | Dillingham | H04L 12/1859 709/206 |

FOREIGN PATENT DOCUMENTS

| | | |
|---|---|---|
| WO | WO 2004/030296 A1 | 4/2004 |
| WO | WO PCT/US14/49950 | 11/2014 |

* cited by examiner

*Primary Examiner* — Scott A Waldron
(74) *Attorney, Agent, or Firm* — Lange IP Law (57) ABSTRACT

The invention relates to a system for processing electronic messages. The system includes a communications module configured to interoperate with a plurality of email servers and coupled to a message processing module. The message processing module is configured to identify inbound messages and process such messages based on statistical analysis, user training, and shared rules. The system is compatible with most existing email clients and servers. The invention also relates to methods for processing messages and methods for training message processing systems.

16 Claims, 7 Drawing Sheets

| EMAIL ACCOUNT RECORD | | | 400 | | | |
|---|---|---|---|---|---|---|
| ACCOUNT ID | HOST | PROTOCOL | PORT | SECURE? | USERNAME | PASSWORD |
| ↑ 400a | ↑ 400b | ↑ 400c | ↑ 400d | ↑ 400e | ↑ 400f | ↑ 400g |

FIG. 4A

| FOLDER RECORD 402 | | | | |
|---|---|---|---|---|
| ACCOUNT ID | FOLDER ID | VALIDITY | LAST MESSAGE ID | IMPORTANCE |
| ↑ 402a | ↑ 402b | ↑ 402c | ↑ 402d | ↑ 402e |

FIG. 4B

| TRAINING RECORD 404 | | | | |
|---|---|---|---|---|
| ACCOUNT ID | KEY | VALUE | ACTION | CREATE TIME |
| ↑ 404a | ↑ 404b | ↑ 404c | ↑ 404d | ↑ 404e |

FIG. 4C

| PROCESSED MESSAGE RECORD 406 | | | | |
|---|---|---|---|---|
| ACCOUNT ID | MESSAGE ID | FOLDER ID | FOLDER ID | ... |
| ↑ 406a | ↑ 406b | ↑ 406c | | |

PROCESSING ELECTRONIC MESSAGES

FIELD OF THE INVENTION

The present invention relates to systems and methods for processing electronic messages.

BACKGROUND OF RELATED TECHNOLOGY

Electronic mail (email) is an established form of communication used ubiquitously by individuals in business and private sectors. An email user may receive a large number of inbound email messages in a given day, which are traditionally delivered to a single folder (typically referred to as the "Inbox") in the user's email system. To identify those messages that the user considers important, the user must review each message in the Inbox, and must manually delete messages that are not considered to be important in order to remove them from the Inbox. Such systems are therefore inefficient in that they require the user to spend a considerable amount of time managing inbound email.

To improve on such traditional systems, some modern email systems provide "filters" which act on (process) inbound messages. Such filters may be based on rules established by the user which define a set of actions to be performed on inbound messages. For example, the user may create a rule whereby any message containing the phrase "Special Offer" is filtered by the system such that it is delivered to a folder intended to contain unimportant messages (e.g. a "Spam" folder). Depending on the system, the message may be automatically moved to the Spam folder upon delivery to the Inbox, or it may bypass the Inbox and be delivered directly to the Spam folder.

While such rule-based-filters provide the user with precise control over inbound messages, they can be time-consuming to create and maintain. Moreover, rule-based filters will not filter messages that do not match a rule previously established by the user, requiring the user to manually review and act on such messages.

To overcome the limitations of rule-based filters, some email systems now include "predictive" filters. Predictive filters use fuzzy logic to determine the action that should be taken on inbound messages, on the basis of message information and a priori information that is stored in the system. Thus, predictive filters are capable of operating without user intervention and may also capable of acting on messages from unknown recipients. For example, email systems are known that rank inbound messages based on metrics derived from earlier user actions to related messages (e.g. Gmail's™ Priority Inbox™ feature; U.S. Published Application No. US20060235933; U.S. Pat. No. 8,095,612).

Some email systems that rank/prioritize email may rely on a specific email client having a custom User Interface (UI) to visually separate important from messages from unimportant messages. Such email systems have a server and client parts which are designed to be used together and thus may be incompatible, or provide degraded operation if a third-part email client is used. For example, Priority Inbox™ provides a custom web UI and mobile application UI (e.g. U.S. Pat. No. 8,312,096) to visually separate a user's Inbox into two or more distinct groups, such as "Important" messages and "Everything Else." However, if a third-party email client is used in conjunction with Gmail's™ email server, such a visual separation between important and unimportant messages may be lost.

While rule-based filters and predictive filters offer increased efficiency in managing email, they are not included in all email systems. Further, many users currently use legacy email systems that lack one or more of the features described above. Some users may be reluctant to switch email systems because of the time and effort involved. Other users may be required by their employer to use a legacy email system.

Thus, there is a need in the art for improved email filtering systems, in particular systems which may be used universally, which are compatible with existing email servers and clients, and which may be customized and/or expanded upon to meet a user's specific needs.

SUMMARY OF THE INVENTION

The present invention provides systems and methods for processing electronic messages which are capable of working with existing systems. Thus, the systems and methods of the present invention allow a user to customize and expand on the filtering features of an existing email system, including adding various filtering capabilities to an existing system that lacks some or all such capabilities. Moreover, the systems and methods disclosed herein are compatible with existing electronic message clients, including desktop, mobile, and tablet email applications.

In one aspect, a method for processing electronic messages includes: connecting to a message server; accessing a user account; retrieving a plurality of source message identifiers from the message server, each source being associated with a source folder; selecting a target message identifier from the plurality of source messages identifiers; determining a target folder associated with the account; and instructing the message server to copy the target message from the source folder to the target folder.

The method can further include one or more of the following steps: instructing the message server to delete the message associated with the target message identifier from the source folder; storing a processed message record in a database, the processed message record having a message identifier associated with the target message identifier and a folder identifier associated with the target folder; fetching a user account record from a database, the account record having a plurality of authentication tokens, and authenticating with the message server using the plurality of authentication tokens, which may be encrypted; fetching a source folder record from a database, the source folder record having a folder identifier associated with the source folder and a last message identifier, wherein retrieving a plurality of source message identifiers is based upon the last message identifier; receiving a notification from the message server in response to a message being delivered to the source folder; retrieving metadata associated with the target message identifier, wherein the target folder is determined by comparing the target message metadata to a plurality of training records; and fetching a plurality of folder records from a database, each folder record having a last known folder identifier, retrieving a plurality of current folder identifiers from the message server, comparing the plurality of last known folder identifiers to the plurality of current folder identifiers, and storing a folder record, the folder record having a folder identifier associated with the renamed folder.

The method can further include: selecting a training folder within the account; retrieving a first plurality of message identifiers from the message server, each message having an identifier and being associated within the training folder; retrieving a second plurality of message identifiers from the message server, each message having an identifier and being associated within the training folder; detecting a trained message identifier included in the second plurality of messages and not included in the first plurality of messages; retrieving metadata (e.g. information about the message sender) associated with the trained message identifier; and storing a training record, the training record having a folder identifier associated with the training folder identifier and metadata associated with the trained message metadata.

In another aspect, a computer system includes: a communications module configured to retrieve a plurality of message identifiers from a message server and to instruct the message server to copy a message from a first folder to a second folder; and a message processing module coupled to the communications module and configured to determine a source folder associated with user account upon a message server, retrieve a plurality of source message identifiers using the communications module, each source message being associated with the source folder, select a target message identifier from the plurality of source message identifiers, determine a target folder associated with the user account and instruct the message server to copy a message associated with the target message identifier from the source folder to the target folder.

The computer system can further include a database module configured to store a processed message records in a database, each processed message record having a message identifier and a folder identifier, wherein the message processing module is coupled to the database module and further configured to store processed message record associated with the target message identifier and the target folder. The database module can be further configured to store training records to the database, each training record having a folder identifier and metadata, and the message processing module can be further configured to determine a training folder within the account, retrieve a first plurality of message identifiers from the message server, each message having an identifier and being associated within the training folder, retrieve a second plurality of message identifiers from the message server, each message having an identifier and being associated within the training folder, detect a trained message identifier included in the second plurality of messages and not included in the first plurality of messages, retrieve metadata associated with the trained message identifier, and store a training record using the database module, the training record folder identifier associated with the training folder and the training record metadata associated with the trained message metadata.

In another aspect, a computer program product embodied on a computer medium includes instructions for: connecting to a message server; accessing a user account; determining a source folder associated with the user account; retrieving a plurality of source messages from the message server, each source message having an identifier and being associated within the source folder, selecting a target message from the plurality of source messages; determining a target folder associated with the account; and instructing the message server to copy the target message from the source folder to the target folder.

The computer program product can further include instructions for: detecting that a folder within the account was renamed and storing a folder record associated with the renamed folder; determining a training folder within the account; retrieving a first plurality of message identifiers from the message server, each message having an identifier and being associated within the training folder; retrieving a second plurality of message identifiers from the message server, each message having an identifier and being associated within the training folder; detecting a trained message identifier included in the second plurality of messages and not included in the first plurality of messages; retrieving metadata associated with the trained message identifier; and storing a training record, the training record having a folder identifier associated with the training folder and metadata associated with the trained message metadata.

BRIEF DESCRIPTION OF THE DRAWINGS

For a better understanding of various aspects of the invention and embodiments thereof, reference should be made to the detailed description below, in conjunction with the following drawings in which like reference numerals refer to corresponding parts throughout the figures.

DETAILED DESCRIPTION OF THE INVENTION

Before describing the present invention, some introductory concepts and terminology are explained. As used herein, a computer system "user" is any person or machine that interacts with the computer system. As used herein, the term "electronic message" means any electronic communication that is sent by at least one user (the sender) to at least one user (the recipient); the sender and the recipient may be the same user or different users. As used herein, the terms "process" and "application process" mean any computing task that is currently executing, or scheduled to execute, on a computer processor. The term "parent process" means a process that created/spawned at least one other process and the term "child process" means a process that was created/spawned by another process. As used herein, the term "metadata" is used to refer to any portion of an electronic message other than the message body and may include any/all email headers as described in RFC 822, which is incorporated herein by reference in its entirety. The terms "metadata" and "headers" may be used synonymously herein. The term "folder" is used herein to refer to a grouping of email messages upon an email server. The terms "folder" and "mailbox" may be used interchangeably herein.

Reference will sometimes herein be made to specific versions and extensions to the IMAP protocol. Such protocols and extensions are described in several Request For . . . RFCs, including RFCs 1730, 1731, 1734, 2060, 2086-2088, 2177, 2180, 2192, 2195, 2342, 2359, 2449, 2595, 2831, 2919, 2971, 3348, 3501, 3502, 3516, 3691, 4314, 4315, 4466-4469, 4550, 4551, 4731, 4959, 4978, 5032, 5092, 5161, 5162, 5182, 5228, 5255-5258, 5321, 5423, 5464, 5465, 5530, 5593, 5703, 5738, 5788, 5819, 5957, 6154, 6203, and 6237, each of which is available at http://www.ietf.org/rfc.html and hereby incorporated by reference in its entirety.

Reference will sometimes herein be made to the Exchange Web Services (EWS) protocol. A description of EWS is available at http://msdn.microsoft.com/en-us/library/exchange/bb204119.aspx, which is hereby incorporated by reference in its entirety.

Reference will sometimes herein be made to the Simple Mail Transfer Protocol (SMTP). A description of SMTP is available at http://tools.ietf.org/html/rfc5321, which is hereby incorporated by reference in its entirety.

Figure 1:
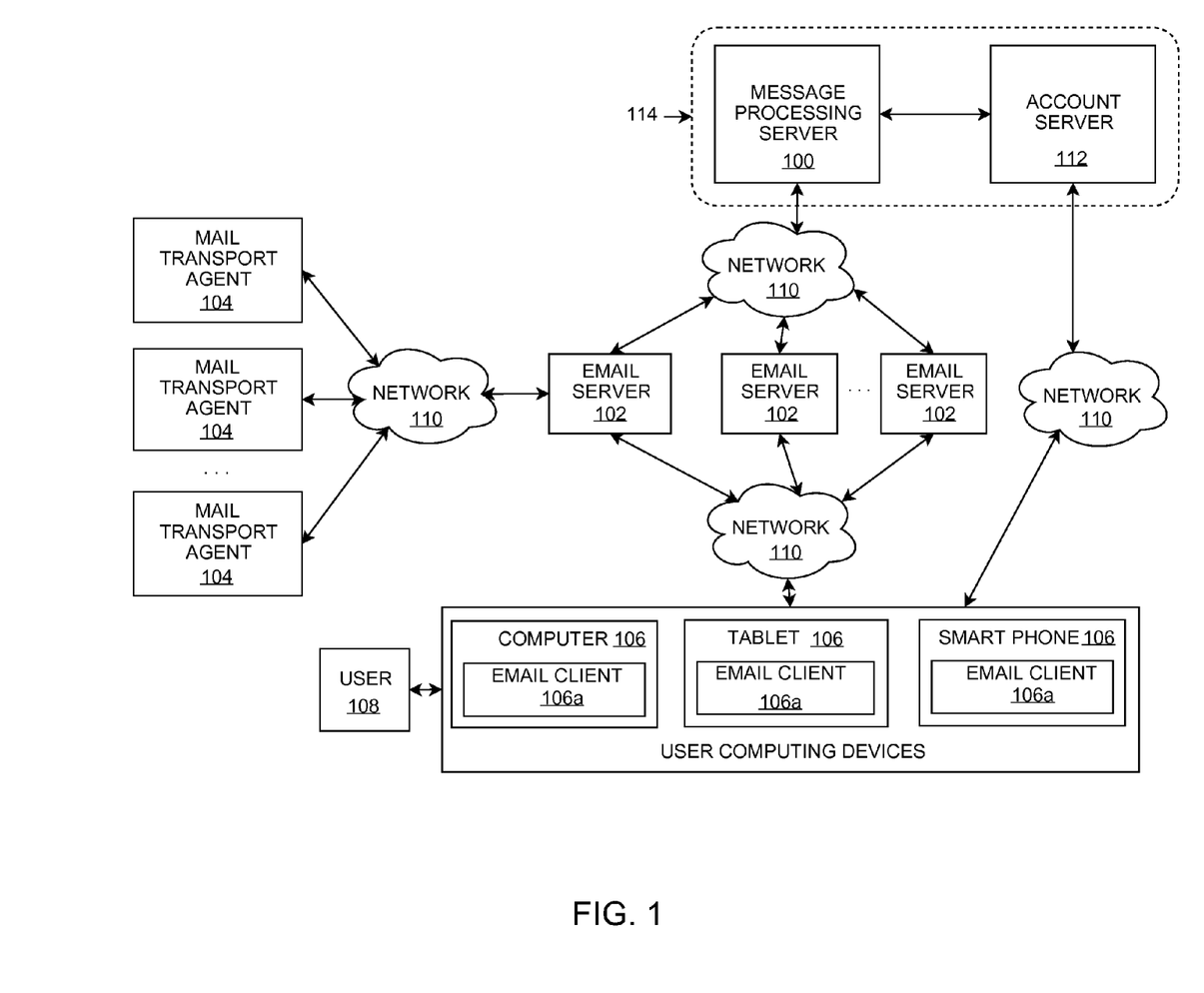
FIG. 1 is a network block diagram showing an exemplary electronic message processing system coupled to existing email systems.

Referring to FIG. 1, an electronic message processing system 114 is shown within an illustrative network environment. The system 114 may include a message processing server 100 and an account server 112, as shown. The illustrative network environment further includes a plurality of email servers 102, a plurality of mail transport agents (MTAs) 104, and a plurality of user computing devices 106. Although three (3) email servers 102 and three (3) MTAs 104 are shown in FIG. 1, the present system is compatible with any number of email servers and MTAs. The message processing server 100, the MTAs 104, and the computing devices 106 may be configured to connect to and communicate with the email servers 102 via a network 110. A user 108 may interact with the plurality of computing devices 106 and corresponding email client applications 106a, as shown. For ease of explanation, the user computing devices 106 and respective client applications 106a will sometimes herein be referred to as "clients." The account server 112 may be coupled to the message processing server 100 and to the plurality of user computing devices 106 via the network 110. The message processing server 100 and account server 112 are discussed further below in conjunction with FIGS. 2 and 3, respectively.

The network 110 may be any suitable local-area network (LAN) or wide-area network (WAN) connection, including the Internet. It will be appreciated that the plurality of email servers 100-102, MTAs 104, and clients 106 may be connected to the network 110 using any suitable wired or wireless type of connection.

Each of the email servers 102 can be any suitable computing platform capable of running an email server application, which includes personal computers (PC), a rack-mounted server hardware, and a virtual host in a cloud computing environments. Each email server application can be any software that is configured to receive inbound email from a MTA, such as MTA 104, and providing certain email retrieval capabilities (described in detail below in conjunction with FIG. 2). As is known in the art, most email server applications 102a implement at least one standardized protocol for email retrieval, such as Exchange Web Services (EWS) and/or IMAP. Thus, by supporting a relatively small number of standardized protocols, the present invention is compatible with most existing email servers, including proprietary servers, such as Microsoft Exchange™, and open-source email servers, such as Dovecot.

Each of the mail transport agents (MTA) 104 may be any suitable hardware and/or software configured to deliver inbound email to one or more email server 102 and to act as a relay between a sender's computer/email application and the destination email servers 102. As those skilled in the art should appreciate, each MTA 104 may represent a plurality of MTAs wherein intermediate MTAs are "chained" together and the MTA 104 represents only the end of the "chain." Typically, an email server 102 will also implement SMTP, thus allowing it to receive inbound email from the MTA 104.

As shown in FIG. 1, the user computing devices 106 may have various types and form factors, and non-limiting examples include desktop computers, notebook computers, mobile phones, smartphones, tablet computers, and wearable computers. Each computing device 106 may include an email client 106a, which is typically a software application configured to receive email message information (e.g. headers and/or body) from an email server 102 and that message information to a user 108. Each email client 106a may be a standalone application which the user may install on a computing device or a web application which is hosted on a web server and accessed via a web browser. Thus, the email clients 106a may include webmail services such as Yahoo! Mail™, desktop applications such as Microsoft Outlook™ and Eudora™, and mobile applications such as the Gmail™ application available on many smartphones and tablet computers. Thus, it should be appreciated that the present invention is compatible with many existing email clients.

Figure 2:
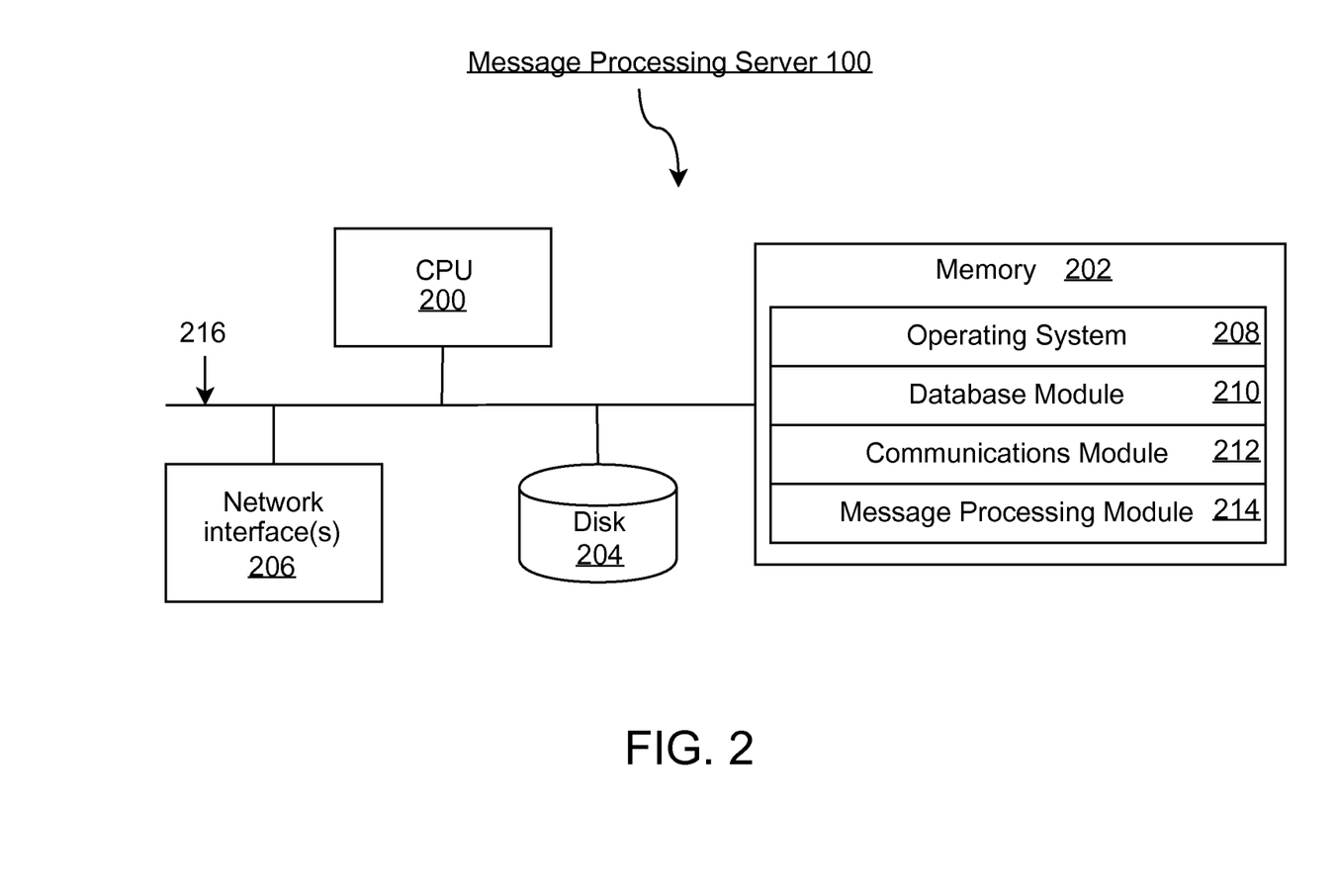
FIG. 2 is a system block diagram showing an illustrative message processing server for use in the electronic message processing system of FIG. 1.

Referring now to FIG. 2 in which like elements of FIG. 1 are shown having like reference designations, a message processing server 100 may include a CPU 200, a memory 202, a disk 204, and a network interface 206, all of which are coupled together via a communications bus 216. The message processing server 100 may be connected to a plurality of email servers 102 (shown in FIG. 1) via network interface 206. The message processor server 100 may be part of any suitable computing platform, including a personal computer (PC), a rack-mounted server, and a virtual host in a cloud computing environment.

The message processing server 100 may include an operating system (OS) 208 that is configured to access the memory 202, the disk 204, and the network interface 206. The OS 208 may be any suitable operating system, including Linux, BSD, OSX, and Windows. A database module 210, a communications module 212, and a message processing module 214 (collectively referred to herein as "the modules") interact with the OS 208 and thus may have (indirect) access to the memory 202, the disk 204, and the network interface 206.

Each of the modules 210-214 will be described more fully hereinbelow, however it should first be noted that each of the modules generally represent certain functionality that can be implemented in software. Those skilled in the art will therefore appreciate that the modules 210-214 can be provided in several forms, including as standalone applications, a plurality of software libraries (either statically or dynamically linked), compiled executable code, and/or a plurality of interpreted source code files.

In one embodiment, each of the modules 210-214 is included within a common daemon application, the OS is capable of multiprocessing (i.e. running multiple concurrent application processes), and a plurality of daemon application processes may be run concurrently within the message processing server 100. A parent daemon application process ("parent process") may be provided to spawn and manage a plurality of child daemon application processes ("child process"). The parent process can be launched either manually by a user or automatically when the server 100 boots up. The parent process may spawn/launch (e.g. using the Linux "fork" system call) a plurality of child processes, each of which utilized some/all of the functionality provided by the modules 210-214. The parent process may delegate work to any of the child processes, may coordinate work among the child process, and may manage the child process lifecycles. In one embodiment, the message processing server operates on a plurality of user email accounts and each user email accounts is assigned to and operated on by one of the plurality of child processes. In certain embodiments, the parent process and/or the child processes may be multithreaded.

The database module 210 may be configured to operate on structured data (records) and to read and write records onto a nonvolatile memory device, such as disk 204. The various types of records for use within the database module 210 are collectively known as "the schema" and may include an email account record, a folder record, a training record, and a processed message record, each of which is described below in conjunction with FIGS. 4A-4D. In one embodiment, the database module 210 includes and/or utilizes a Relational Database Management System (RDBMS). It should be appreciated that certain RDBMSs, such as MySQL™, provide a standalone server application and a client library configured to communicate with the server application. However, certain other RDBMSs, such as SQLite, are provided as standalone libraries which can be embedded within an application. Thus, in certain embodiments the database module 210 may include a server application and a client library, whereas in other embodiments, it may include just a client library. The database module 210 may further include an encryption library capable of performing symmetric encryption and decryption on blocks and/or streams of data. In certain embodiments, the database module 210 stores data records in an unstructured database, such as flat files or a key/value store.

The database module 210 may provide a high-level record management interface to the other modules 212-214. For example, the database module 210 interface may include the standard Create, Read, Update, and Delete (CRUD) operations for each type of record included in the schema. As part of these operations, the database module 210 may perform a plurality of sub-operations including, but not limited to, validating untrusted data, encrypting/decrypting sensitive data, and providing notifications that a record was accessed, modified, or deleted. In one embodiment, the data module 210 includes and utilizes an Object Relational Mapping (ORM) library such as Hibernate (Java) or ActiveRecord (Ruby) which may provide CRUD operations and at least some of the sub-operations listed above. It should therefore be appreciated that the database module 210 may encapsulate relatively low-level database operations within a high-level interface that can be used other modules 212-214.

The communications module 212 may be configured to communicate with each of the plurality of email servers 102 using network interface 206 via the operating system 208 and the bus 216. The network interface 206 may be a hardware-based network interface card (NIC) or a virtual network interface, such as may be provided in a cloud computing environment. In one embodiment, the network interface 206 is an Ethernet adapter. The communications module 212 may include networking libraries that implement various Internet protocols/layers, such as ARP, IP, DNS, TCP, SSL, HTTP, and SOAP in addition to several email server retrieval protocols, including IMAP and EWS. The communications module 212 may also include data formatting libraries, such as an XML builder/parser library and text manipulation libraries.

The communications module 212 may provide a high-level interface that the other modules 212-214 can use to interact with the email servers 102. The communications module 212 may include adapters for a plurality of standard email retrieval protocols and thus provides a high-level unified interface to many existing email servers. In certain embodiments, the module 212 includes an IMAP adapter that is compatible with IMAP Versions 2 and 4, and may be configured to take advantage of several IMAP extensions, including the UIDPLUS Extension, the IMAP4 IDLE command, the IMAP List Extension for Special-Use Mailboxes, the Multi-mailbox Search Extension, the Extension for Fuzzy Search, COMPRESS Extension, and the IMAP Metatdata extension. In further embodiments, the communications module 212 includes an EWS adapter that is compatible with Exchange Server 2007, 2010, 2013, and all other Exchange Server versions that include a web services API.

In one embodiment, the communications module interface includes the commands shown in first column of TABLE 1. As shown, an IMAP adapter may execute the IMAP commands shown in the second column of TABLE 1 in response to corresponding interface commands. Further, an EWS adapter may execute the EWS commands shown in the third column of TABLE 1 in response to corresponding interface commands. It should be appreciated that certain commands shown may return a large amount of data, and thus in certain embodiments, batching techniques may be used to limit the size of data transfers between the message processing server 100 and an email server 102 (FIG. 1).

TABLE 1

| Interface Command | IMAP Commands(s) | EWS Commands(s) |
|---|---|---|
| StartSession(host, port, username, password) | Open TCP/IP connection to host, port. CAPABILITY LOGIN user password | Open HTTP connection to host, port using NTLM Auth |
| RetrieveFolderList( ) | LIST "*" | FindFolder |
| CreateFolder(folderId) | CREATE folderId | CreateFolder folderId |
| DeleteFolder(folderId) | DELETE folderId | DeleteFolder folderId |
| RetrieveNewMessageHeaders (folderId, lastMessageUid) | SELECT folderId | itemIds = FindItem folderId, uid >= lastMessageUid |
| | FETCH lastMessageUid:* BODY.PEEK[HEADER.FIELDS (MESSAGE-ID FROM . . .)] | GetItems itemIds |
| CopyMessages(sourceFolderId, messageUids, targetFolderId) | SELECT sourceFolderId | itemIds = FindItem sourceFolderId messageUids |
| | COPY messageUids targetFolderId | CopyItem itemIds, targetFolderId |
| MoveMessages(sourceFolderId, messageUids, targetFolderId) | SELECT sourceFolderId | itemIds = FindItem sourceFolderId messageUids |
| | COPY messageUids targetFolderId | CopyItem itemId targetFolderId |
| | STORE messageUids + FLAGS (\DELETED) EXPUNGE | DeleteItem itemIds |

TABLE 1-continued

| Interface Command | IMAP Commands(s) | EWS Commands(s) |
| --- | --- | --- |
| DeleteMessages(folderId, messageUids) | SELECT folderId | itemIds = FindItem folderId messageUids |
| | STORE messageUids + FLAGS (\DELETED) EXPUNGE | DeleteItem itemIds |
| EndSession( ) | LOGOUT Close TCP/IP connection. | Close HTTP connection. |

As should be appreciated by those in the art, certain existing email servers/services may purport to implement a standard mail retrieval protocol (e.g. IMAP), however it is not uncommon for such servers/services to fail to implement the entire protocol, or to implement portions of the protocol incorrectly. Thus, in certain embodiments, the communications module 212 includes patch code that allows a corresponding protocol adapter workaround such deficiencies, and thus allows the message processing server 100 to communicate with otherwise incompatible email servers. Alternatively, such patch code could be included within the message processing module 214. The communications module 212 and/or messaging processing module 214 may determine whether to use patch code based on one or more of the email servers attributes, such as the email server host, capabilities reported by the email server protocol (e.g. using the IMAP "CAPABILITY" command), or observed email server behavior.

Figure 4A:
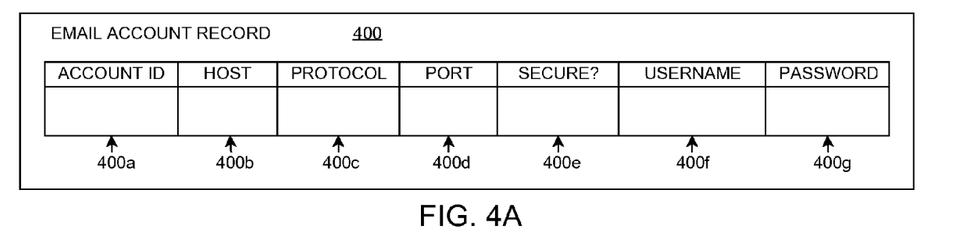
FIGS. 4A-D are pictorials showing several illustrative database records for use by the electronic message processing system of FIG. 1.

The message processing module 214 may be coupled to both the database module 210 and the communications module 212 (directly and/or via the OS 208), and may be configured to operate upon a plurality of user email accounts. In certain embodiments, the message processing module 214 can determine the plurality of user email accounts by fetching a list of email account records (as shown in FIG. 4A) from the database module 210. The message processing module 214 operates upon each user email account by performing various useful functions, which are described below in conjunction with FIGS. 5-7. Suffice it to say here, the message processing module 214 can operate upon messages stored upon an email server using the communications module 212 interface and can operate upon database records using the database module 210 interface.

Figure 3:
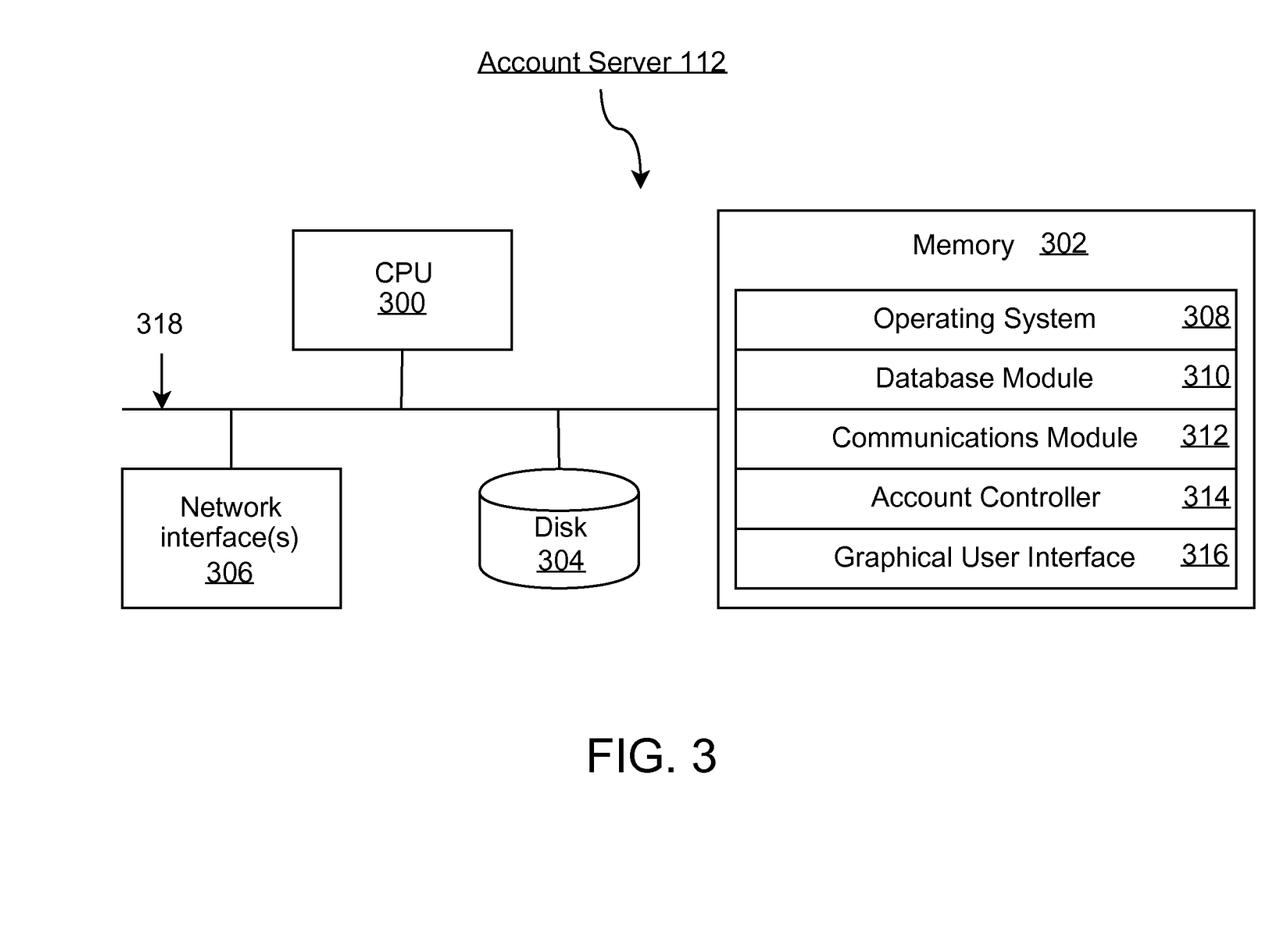
FIG. 3 is a system block diagram showing an illustrative account server for use in the electronic message processing system of FIG. 1.

Referring now to FIG. 3, an account server 112 for use in the present invention is shown. The account server may include a CPU 300, memory 302, a disk 304, and a network interface 306, all of which are coupled together via a communications bus 318. In certain embodiments, the account server 112 and the message processing server 110 may share a common physical or virtual computing platform and therefore the CPU 300, the memory 302, the disk 304, and the network interface 306 shown in FIG. 3 may be the same as the CPU 200, the disk 204, and the network interface 206 shown in FIG. 2, respectively. In another embodiment, the servers 100 and 112 may exist on separate physical computing platforms. In yet another embodiment, the servers may be separate virtual computing platforms that run upon a common physical computing platform.

The account server 112 may include an operating system (OS) 308 that is configured to access the memory 302, the disk 304, and the network interface 306. The OS 308 may be any suitable operating system discussed above in conjunction with the message processing server OS 208. The account server includes a database module 310 and a communications module 312 (collectively referred to herein as "the modules") that may be the same as or similar to the message processing server database module 210 and communications module 212, respectively. The account server further includes an account controller 314 coupled to both the database module 310 and the communications 312, and a graphical user interface (GUI) 316 that is coupled to the account controller 314.

As discussed above in conjunction with the message processing server, the modules 310 and 312, the account controller 314, and the GUI 316 generally represent certain functionality that can be implemented in software and it should be appreciated that they can be provided in several different forms. In certain embodiments, the message processing server 100 and the account server 112 may be a common virtual or physical computing platform, and thus message processing server OS 208 may be the same as the account server OS 308. In addition, the database module 210/310 and communications module 212/312 may be shared libraries that are used by both a message processing server application process and an account server application process.

In one embodiment, the modules 310 and 312, the account controller 314, and the GUI 315 are bundled together as a web application that executes inside a web application server/container. The web server/container may process concurrent requests using multithreading, event-driving loops, and/or multiple processes. Non-limiting examples of suitable web servers/containers include Apache HTTP Server, Apache Tomcat, WebSphere, Phusion Passenger, and Node.js.

In certain embodiments, the account controller 314 is coupled the message processing module 214 and therefore the account server 212 may provide notifications directly to the message processing service 200, such as notifying the message processing server when an email account is added, changed, or removed from the system. Any suitable type of inter-process communication may be used.

In certain embodiments, the database modules 212 and 312 can include and/or interact with a common RDBMS, which may be an embedded database (e.g. SQLite) or a standalone database (e.g. Postgres or MySQL). In one embodiment, the database modules 212 and 312 interact with a common database server which may runs on a separate computing platform (not shown in FIG. 2 or 3). In another embodiment, the message processing server 100 and the account server 112 are separate computing platforms and each have access to a shared disk 204/304 which may be a network-attached storage (SAN) device.

The account controller 314 and GUI 316 operate together to provide various email account management functions to a user 108 (FIG. 1). In certain embodiments, the GUI 316 includes a plurality of web pages which allow the user 108 to add, modify, and remove email accounts from the system. In one embodiment, the GUI 316 includes a web-based interface wherein a user may enter an email address, an email server address/host and port, a username, and a password. The account server 112 may, in turn, create a corresponding email account record (such as is shown in FIG. 4A) using the database module 210. The account controller may also notify the message processing server 100 that an account has been added and is ready to be configured, as discussed further below in conjunction with FIG. 5.

In one embodiment, the GUI 316 includes a streamlined web-based interface for adding a new account, wherein the user need enter only an email address and a password. The account controller 314 may, in turn, auto-discover any additionally required email server settings, including a suitable host, protocol, and port, the username, and whether a secure connection should be used. This auto-discovery process may be based on frequently used naming conventions. For example, an email account username is typically the same as, or similar to, the email address mailbox (i.e. the part of the address preceding the "@" symbol). Further, a suitable email server host can often be derived from the email address domain (i.e. the part of the address following "@" symbol), for example by prepending "mail." or "imap.". Moreover, by convention, port 143 is used for IMAP, port 993 is used for IMAP over TLS/SSL (IMAPS), port 80 is used for HTTP (i.e. web services), and port 443 is used for HTTP over TLS/SSL (HTTPS). In one embodiment, the account controller 314 may attempt to autodiscover secure server settings before insecure settings. Thus, it should be appreciated that many combinations of prospective email server settings can be derived for use in the autodiscovery process. For example, if a user enters the email address "jane@nineco.com", the account controller 314 may choose to try certain combinations of the host names "nineco.com", "mail.nineco.com", and "imap.nineco.com", the IMAP and EWS protocols, the ports 993, 143, 80, and 443, as shown in TABLE 2.

An iterative auto-discovery process may be used wherein the controller 314 may choose a first combination of settings and then attempt to establish a mail session based on those settings. If the account controller successfully establishes a mail session, the auto-discovered settings and user-entered password can be stored in a new email account record 400 (FIG. 4A) for use by the message processing server 100. Otherwise, a new combination of email server settings may be chosen and the autodiscovery process may be repeated. Several combinations of settings may be tried in parallel to reduce processing time. If none of the chosen combinations lead to a successful session, the account controller 314 (using GUI 316) may prompt the user to enter any necessary email server settings.

TABLE 2

| Combination | Server Host | Protocol | Port | Secure? | Username |
|---|---|---|---|---|---|
| 1 | nineco.com | IMAP | 993 | true | jane |
| 2 | nineco.com | IMAP | 143 | false | jane |
| 3 | mail.nineco.com | IMAP | 993 | true | jane |
| 4 | mail.nineco.com | IMAP | 143 | false | jane |
| 5 | imap.nineco.com | IMAP | 993 | true | jane |
| 6 | imap.nineco.com | IMAP | 143 | false | jane |
| 7 | nineco.com | EWS | 443 | true | jane |
| 8 | nineco.com | EWS | 80 | false | jane |
| 9 | mail.nineco.com | EWS | 443 | true | jane |
| 10 | mail.nineco.com | EWS | 80 | false | jane |
| 11 | ews.nineco.com | EWS | 443 | true | jane |
| 12 | ews.nineco.com | EWS | 80 | false | jane |

In certain embodiments, the account controller 314 may further include a lookup table of email server settings for popular email service providers, including Yahoo Mail, Gmail.

In certain embodiments, the account controller 314 and GUI 316 may provide additional account management features to the user, including the ability to update an email account record (e.g. change the account password), delete/disable an email account record, create/update/delete training records, and view message processing statistics.

Referring now to FIGS. 4A-4D, several database records types 400-406 for use in the present system are shown. The records types 400-406 may collectively herein be referred to as the "schema." Each database record type 400-406 represents a data structure having a set of attributes, such as attributes 402a-402g shown in FIG. 4A. Any or all of data structures 400-406 may be used with within a message processing server and an account server, such as servers 100 and 112 in FIG. 2, The message processing server 100 and/or account server 112 (FIG. 1) may include a plurality of database records, which can be stored within volatile memory and/or stored a disk, and each of the database records may have a structure corresponding to one of the record types 400-406.

In certain embodiments, the database module 210/310 (shown in FIGS. 2/3) utilizes a relational database having a plurality of relations (commonly referred to as "tables"). Each table may correspond to one of the plurality of record types 400-406 and may have a plurality of columns, each column corresponding to one of the set of attribute names. Each table may further have a plurality of rows and each row may correspond to a database record of the same type.

Before describing the database record types 400-406 in further detail, some introductory concepts are explained. Most email servers organize messages hierarchically: an email server may include a plurality of email accounts; each email account may include a plurality of folders (sometimes referred to as "mailboxes" and/or "labels"); and each folder may include a plurality of messages. Further, an email server may be identified by a hostname/address and port, an email account may be identified by a username that is unique to the server, and a folder may be identified by a name/label or other identifier that is unique to the email account. Certain folders may be created automatically by the email server (e.g. "INBOX" and "Sent"), whereas other folders may be created by a user. In the present system, certain folders may be created automatically by a message processing server, as discussed further below in conjunction with FIG. 5.

Referring now to FIG. 4A, an email account record 400 may include attributes which allow a message processing server (such as processing server 100 in FIG. 1) to operate on a user's email account by initiating a mail retrieval session upon an email server 102 (FIG. 1). Each email account record 400 may include an account id 400a, an email server host 400b, a mail retrieval protocol 400c, an email server port 400d, a secure connection flag 400e, a username 400f, and a password 400g. The account id 400a may be an email address, a synthetic unique identifier (e.g. a UUID or a sequence number), or any other identifier unique to the present system. In certain embodiments, each email account record 400 may further include a user id attribute (not shown) which can be used to associate multiple email accounts belonging to an individual user. The email server host 400b may be the network address (e.g. IP address) or a qualified network host name of the email server and the email server port 400d may be a TCP port number associated with the email server application. The secure connection flag 400b indicates whether a secure socket layer connection (e.g. TLS/SSL) should be used to communicate over the specified host 400b and port 400d.

The username 400f may uniquely identify an email account within the email server and the password 400g may be a corresponding authentication token. The password may be a passphrase, an encryption key, an OAuth token, or any other type of authentication token accepted by the email server. In certain embodiments, the username and/or password can be encrypted using any suitable symmetric encryption algorithm (e.g. Blowfish). The username and password may herein collectively be referred to as "authentication tokens."

Figure 4B:
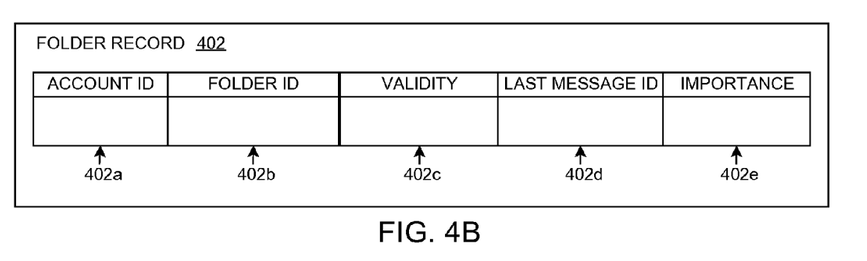

Referring now to FIG. 4B, a folder record 402 for use in the present invention may include an account id 402a, a folder id 402b, a validity 402c, a last message id 402d, and an importance 402e, as shown. The account id 402a may correspond to an email account record and thus may be used to associate a plurality of folder records 402 with an email account record 400 (i.e. provides a "many-to-one" association with an email account record). The folder id 402b is any value that uniquely identifies the folder within the associated email account and may be the folder name/label used upon the email server. The validity 402c may correspond to a folder validity value provided upon the email server and may be used to detect folder renames and/or used to determine if the last message id value is valid, as discussed below with FIG. 6. The last message id 402d may be a unique identifier corresponding to the last message processed by a message processing server in the folder, or blank of no messages have been processed yet. Wherein the associated email account protocol is IMAP, the last message id 402d can be the Unique Identifier (UID) Message Attribute and the validity 402c can be the IMAP folder UIDVALIDITY. As discussed further below in conjunction with FIG. 6, the importance 402e may be used by a message processing server to decide if an inbound message should be automatically moved to the associated folder upon the email server. The importance level can be a number (e.g. 0, 1, 2) or a symbol (e.g. "high," "medium," and "low").

Figure 4C:
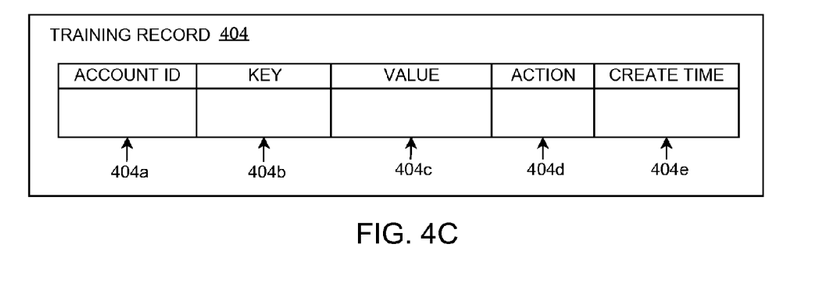

Referring now to FIG. 4C, a training record 404 for use in the present invention may include an account id 404a, a key 404b, a value 404c, an action 404d, and a create time 404e, as shown. The account id 404a may correspond to an email account record account id 400a, and thus may be used to associate a plurality of training records 404 with an email account record 400 (i.e. provides a "many-to-one" association). The key 404b may be any message header field, including, but not limited to, "Sender", "From", "Subject", "To", "cc", "bcc", "Delivered-To", "List-Id", "Message-ID", "Resent-Message-ID", "In-Reply-To", "Resent-To", "Resent-cc", "Resent-bcc", "Return-Path", "Content-Type", and "X-Autoreply" and the value 404c may be the header value, or derivation thereof, associated with that header field. Alternatively, the key 404b may be a symbol that represents a combination of several headers. For example, the key "sender" may be used to represent a combination of headers that may identify a sender, as discussed below with FIGS. 5-7. The action 404d may provide instructions for processing inbound messages which match the key 404b and value 404c, and may be provided in any suitable format. In an embodiment, the action 404d may be an importance level and may indicate that matching messages should be moved to the folder associated with the corresponding importance level (i.e. the folder associated with a folder record having an "importance" attribute which matches the training "action" attribute). In certain embodiments, the action 404d may be domain-specific language (DSL). The create time 404e may indicate the time the training action was detected and/or the time the training record was created. The create time 404e may be used to resolve training conflicts, as discussed below in conjunction with FIG. 6. Training records may be created in response to a direct user action, in response to indirect user action, or automatically based on the message processing methods described below in FIGS. 5 and 7.

Figure 4D:
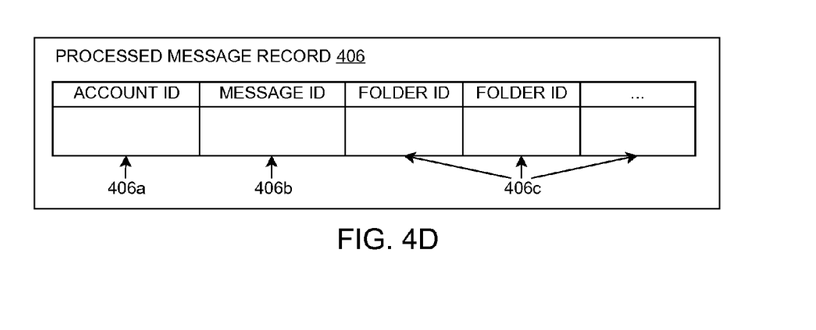

Referring now to FIG. 4D, a processed message record 406 for use in the present invention may include an account id 406a, a message id 406b, and a plurality of destination folders ids 406c, as shown. The account id 406a may correspond to an email account record account id 400a, and thus may be used to associate a plurality of processed message records 406 with an email account record 400 (i.e. provides a "many-to-one" association). The message id 406b can be any message identifier that is unique within the associated email account. In an embodiment, the message id 406b may be the "Message-ID" header value, as described in RFC 822. However, it should be appreciated that some email messages have a blank or missing "Message-ID" header value and thus, in certain embodiments, a surrogate identifier may be used instead. For example, a surrogate identifier can be created by concatenating certain other message header values. Each of the plurality of destination folders ids 406c may correspond to a folder record folder id 402b and thus may be used to associate a processed message record 406 with a plurality of folder records 402.

It should be appreciated that each record type 400-406 may include additional attributes not shown in FIGS. 4A-4D. For example, each record type 400-406 may include a create timestamp and/or an update timestamp (not shown) that indicate the time a record was created and last updated, respectively.

Figure 5:
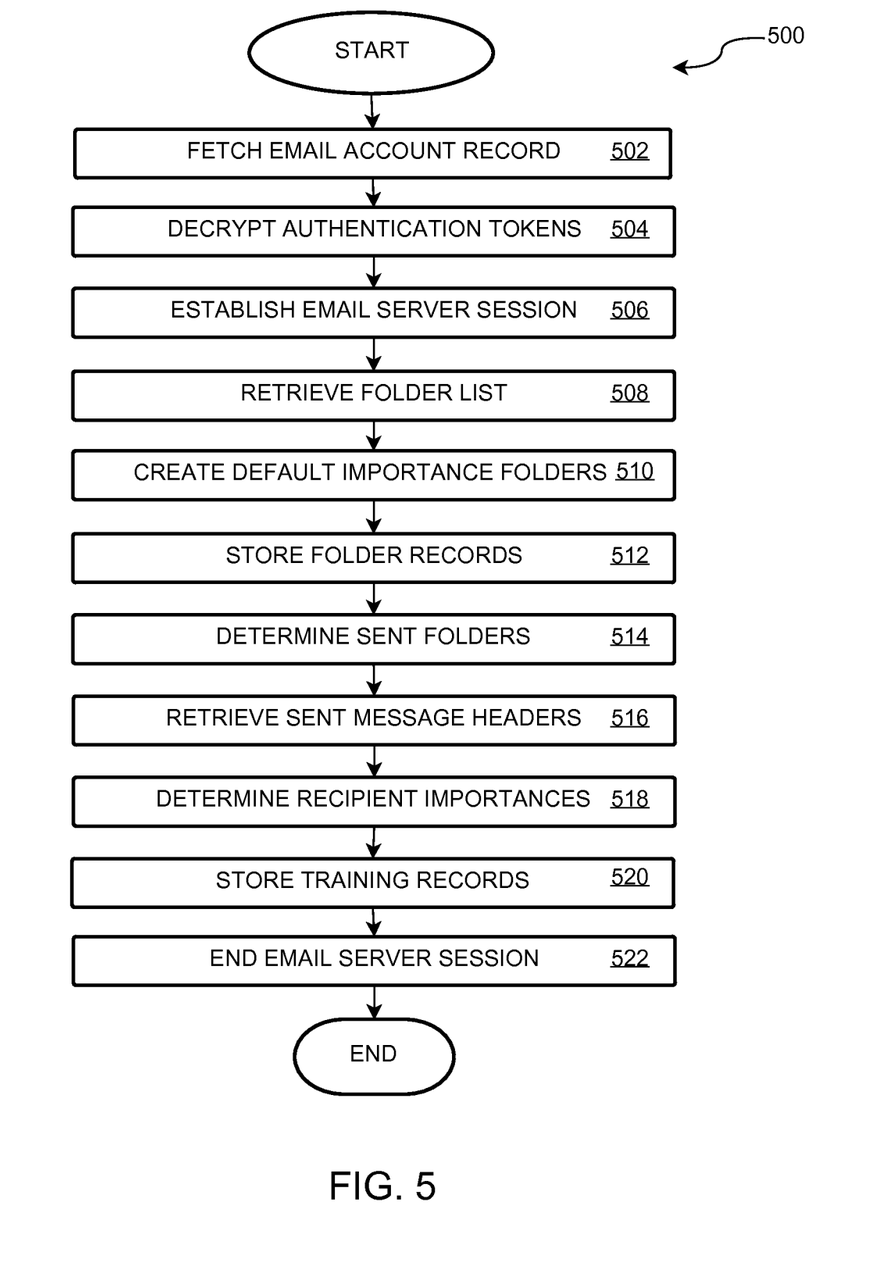
FIG. 5 is a flowchart showing an illustrative method of configuring an account for use in an electronic message processing system.
Figure 6:
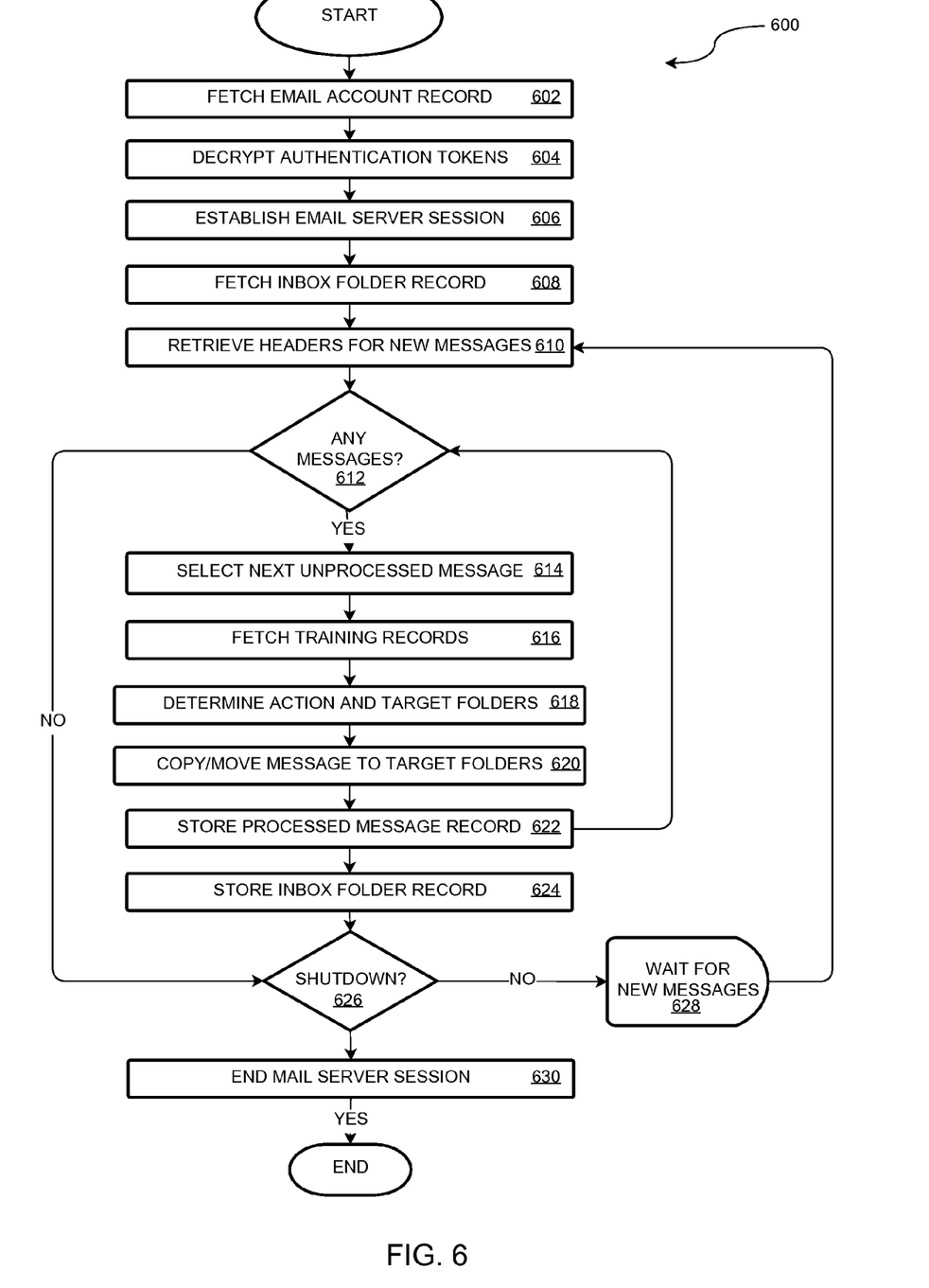
FIG. 6 is a flowchart showing an illustrative method of processing electronic messages.
Figure 7:
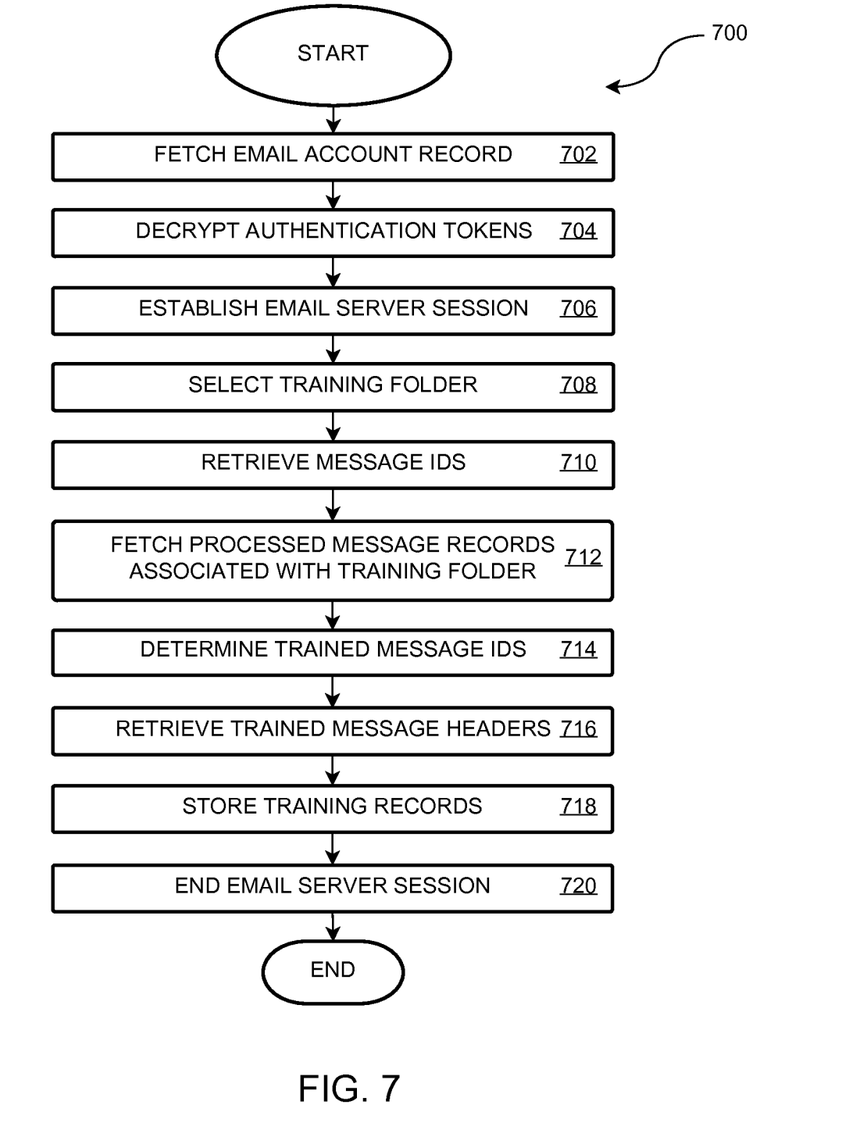
FIG. 7 is a flowchart showing an illustrative method of training an electronic message processing system.

Referring now to FIGS. 5-7, it should be appreciated that these flowcharts correspond to the below contemplated techniques and would be implemented in a computer system, or more specifically, a message processing system 114 (FIG. 1). Rectangular elements (typified by element 502 in FIG. 5), herein denoted "processing blocks," represent computer software instructions or groups of instructions. Diamond shaped elements (typified by element 612 in FIG. 6), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring to FIG. 5, an exemplary method 500 of configuring an email account for use in the present system is shown. In one embodiment, the method described herein may be performed by a message processing server 100 and implemented within a message processing module 214 (FIG. 2). However, in another embodiment, the method may be performed, at least in part, by an account server 112 and implemented within an account controller 314 (FIG. 3).

First, an email account record is fetched 502 from a database using a database module 210 (FIG. 2). The email account record may have the same or similar structure as record 400 in FIG. 4A. The email account record, which is associated with an email account, may have been previously created/stored by an account server in response to user actions, as described above in conjunction with FIG. 3. In certain embodiments, the email account record authentication tokens may be symmetrically encrypted and, thus, the next step of the process may be to decrypt 504 authentications tokens. Using the email server settings and decrypted authentication settings from the email account record, a session can be established 506 upon a suitable email server using a communications module 212 (FIG. 2).

Next, a list of existing folder ids associated with the email account may be retrieved 508 using the communication module 212, as shown.

The message processing server 100 may proceed to create 510 a plurality of default folders based upon a list of default "importance" levels and a folder id/name corresponding to each level. Each default importance level can be a number (e.g. 0, 1, 2) or a symbol (e.g. "high," "medium," and "low") and each corresponding folder id can be any folder id that is valid within email account. In one embodiment, the present system includes a default importance level "high" and a corresponding to a folder id "INBOX." The server 100 may compare the list existing folder ids to the list of default importance folder ids and create the default importance folders that do not yet exist 510 using the communications module 212.

Next, the message processing server 100 may store/create 512 a plurality of folder records, each folder record corresponding to a folder within the email account. Each folder record may have the same or similar structure to record 402 shown in FIG. 4B. In particular, each folder record may have an "account id" attribute corresponding to the email account record "account id" attribute. Folder records that correspond to default importance folders may have a "folder id" attribute corresponding to the default importance folder id and an "importance" attribute corresponding to the default importance folder importance level.

Still referring to FIG. 5, the message processing server 100 may next determine 514 a plurality of folder ids corresponding to folders that predominately include outbound email, herein referred to as "sent folder ids." As disclosed herein, various techniques may be employed to determine the sent folder ids. As will be appreciated be those in the art, most email accounts include at least one folder into which outbound email (that is email sent by the account's user) is copied, either by the user's email client or by email server. Moreover, certain folder ids/names are common given to the sent folder, including as "Sent" and "Sent Mail." Thus, according to one technique, the message processing server 100 may determine the plurality of sent folder ids by matching (e.g. using regular expression pattern matching) each of the retrieved folder ids to each of the common sent folder ids. According to another technique, the message processing server 100 may determine the sent folder ids by searching for folders associated with the mail account that include a high percentage of emails sent by the user. For example, the server 100 could retrieve a list of all message ids within a folder having a "FROM" address associated with the user's email account and compare the size of this list against the total number of messages within the folder; the server 100 could repeat this process for several/all of the folders associated with the account. According to yet another technique, the sent folder id may be provided by the user 108 via the account server 112 (FIG. 1).

Next, using the sent folder ids previously determined, the message processing server 100 can retrieve 516 recipient headers for a plurality of messages within the sent folders using the communications module 212. In certain embodiments, headers for all messages may be retrieved. However, to reduce the time required to configure a new account, in other embodiments only a sample of messages may be retrieved and analyzed as described herein. Such a sample can be based upon a maximum number of messages, a message date range, or any other suitable criteria. The recipient headers may include headers that identify the recipient of a message, including, but not limited to, "To", "cc", "bcc", "Delivered-To", and "In-Reply-To."

Having retrieved certain headers for a plurality of sent messages, the message processing server 100 can proceed to determine 518 an importance level for each corresponding message recipient using any suitable technique/heuristic. According to one technique, each recipient is assigned the same importance level as every other recipient. According to another technique, frequency analysis may be employed wherein each recipient may be assigned an importance level based upon the total number of messages sent to that recipient. In another technique, recency analysis may be applied whereby a recipient of a more recently sent message may receive a higher importance level than the recipient of a less recently sent message.

Using the previously determined recipient importance level, the message processing server 100 may next store/create 520 a plurality of training records. Each training record may include an "account id" attribute corresponding to the email account "account id" attribute, a "key" attribute having a symbolic value (e.g. "sender"), a "value" attribute corresponding the recipient address and/or name, and an "action" attribute corresponding to the determined recipient importance level. Thus, it should now be appreciated that the method 500 described hereinabove uses certain techniques/heuristics to train the message processing system based upon the user's past behavior. Such training allows a message processing server to predicatively filter inbound messages, as described below in conjunction with FIG. 6.

Finally, having configured the email account, the email server 100 may end 522 the email server session via the communications module 212.

Referring now to FIG. 6, an exemplary method of processing electronic messages 600 is shown. The method described hereinbelow can be performed by a message processing server 100 and implemented within a message processing module 214 (FIG. 2).

First, an email account record (such as record 400 in FIG. 4A) is fetched 602 from a database using a database module 210 (FIG. 2). The email account record, which is associated with an email account, may have been previously configured according to the method described above in conjunction with FIG. 5. Next, the email account record authentication tokens may be decrypted 604 and an email server session may be established 606 via a communications module 212 (FIG. 2).

Next, the message processing server 100 may fetch an Inbox folder record associated with the user's Inbox 608. The folder record may have the same structure as record 402 described above with FIG. 4B. In particular, the Inbox folder record may have a "last message id" attribute and a "validity" attribute. Wherein the last message id is an IMAP UID value, the message processing server 100 may additionally retrieve the current Inbox UIDVALIDITY value from the email server and disregard the folder record last message id if the folder record validity does not match the retrieved UIDVALIDITY (i.e. the last message id is no longer valid).

Having the last message id, the message processing server 100 can proceed to retrieve 610 headers for a plurality of unprocessed messages within the Inbox using the communications module 212. In one embodiment, the server 100 may retrieve the headers: "Sender", "From", "Return-Path", "Delivered-To", "To", "In-Reply-To", "cc", "bcc", "Subject", "List-Id", and "Message-ID". If no headers are retrieved 612 (i.e. no unprocessed messages exist within the account Inbox), the message processing server 100 may shut down or wait for new messages to arrive, as discussed hereinbelow. Otherwise, the server 100 may process each of the unprocessed messages.

The message processing server 100 may select 614 the next unprocessed message for processing. First, the server 100 may fetch 616 a plurality of training records associated with an unprocessed message from the database using the database module 210. The training records may have a structure similar to or the same as record 404 in FIG. 4C. The training records may have been created automatically according to the method discussed above with FIG. 5, indirectly by the user according to the method discussed below with FIG. 7, or directly by the user via the account server 112 (FIG. 1). The server 100 may fetch training records based upon various criteria. For example, the message processing server 100 may fetch all records having the key "sender" and a value similar to any header that identifies the sender (e.g. "Sender", "From", and "Return-Path"), all records having the key "Subject" and a value similar to the unprocessed message "Subject" header, and/or all records having the key "List-Id" and a value similar to the unprocessed message "List-Id" headers.

Next, the message processing server 100 may determine 618 a plurality of actions to take upon the unprocessed message. In certain embodiments, each such action includes a plurality of target folders and an indication as to whether the message should be moved or copied to the target folders.

In certain embodiments, the message processing server 100 determines a plurality of actions to take based upon the plurality of training record "action" attributes. It should be appreciated that two or more of the fetched training records may have conflicting actions. For example, one training record may indicate that the message should be moved to a "high" importance folder, whereas a second training record may indicate that the message should be moved to a "low" importance folder. Thus, the message processing server 100 (more specifically, the message processing module 214) may include various methods for resolving training conflicts. According to one method, the sever 100 may choose the action corresponding to the training record with the most recent "create time" attribute. According to another method, the server 100 may choose the action which appears most frequently among the fetched training records. In yet another method, the server may choose an action corresponding to a high importance level over an action corresponding to a low importance level. Any suitable conflict resolution method, or combination of methods, may be used within the present system.

The server 100 may further determine the actions to take based upon a plurality of shared rules provided within the message processing module 214. Similar to a training record, a shared rule may include key/value pair to match and an action to take upon such a match. Such rules can be global, meaning they apply to all email accounts within the system, or otherwise shared and applied across one or more accounts. Such rules may be included statically with the application, provided within a configuration file, and/or maintained within the database. The message processing server 100 may further include techniques to resolve conflicts between shared rules and training records, including any of the conflict resolution techniques described hereinabove.

If no training records and no shared rules match the unprocessed message, the message processing server 100 may apply a default action. In one embodiment, the default action is to move the message to a folder corresponding to a "low" importance level.

Next, the message processing server 100 can copy or move 620 the unprocessed message to the target folder ids using the communications module 212. It should be appreciated that any/all of the target folder ids may have been rendered invalid due to a user action, such as the user renaming a folder using an email client. Therefore, in one embodiment, the server 100 may determine if any of the target folder ids are invalid and, further, what the corresponding valid folder ids are (e.g. the new name of a renamed folder). In one embodiment, the server 100 may determine the new folder id by comparing the associated folder record "validity" attribute to a list of folder validity values retrieved from the email server. In another embodiment, the server 100 may determine the new folder id by periodically retrieving a list of folders from the email server and comparing the current list to the previous list.

In one embodiment, the message processing server 100 may aggregate ("batch") certain operations that read or write from the email server to reduce the number of network operations and thus improve system efficiency.

Next, the message processing server 100 may store 622 a processed message record corresponding to the newly processed message. The processed record message may have the same or similar structure as record 406 in FIG. 6. In particular, the processed record message may have a message id associated with the newly processed message id and a plurality of folder ids associated with the plurality of target folders. As will be appreciated, the processed message records may serve several different purposes with the present system. In one respect, the processed message records can be used to allow a user to indirectly train the system, as discussed below in conjunction with FIG. 7. In another respect, the processed message record serves as a history of processing operations performed by the present system and therefore can be used to store messages to a user's Inbox upon request.

Next, the Inbox folder record "last message id" attribute may be updated 624 to correspond to the newly processed message and stored in the database via the database module 210. In certain embodiments, the Inbox folder record may be stored only periodically to reduce the number of database operations and thus improve system efficiency.

Having processed all messages in the user's Inbox, the message processing server 100 may either 626 shutdown or wait for new messages to arrive. In one embodiment, the server 100 may shutdown in response to a signal sent by an operator.

The message processing server 100 may use either a polling-based technique or an interrupt-based technique to wait 628 for new messages. In one embodiment, the server 100 uses the IMAP IDLE feature (as described in RFC 2177) to receive a notification from certain email servers that a new message has within the user's Inbox. In another embodiment, the server 100 checks for new mail periodically (i.e. polls) using the communications module 212.

Before the message processing server 100 shuts down, it may first end 630 the session upon the email server using the communications module 212. As discussed above with FIG. 2, the message processing server 100 may assign each email account to a separate process/thread, and thus only the corresponding process/thread may be terminated whereas any other server 100 processes/threads (including a parent process/thread) may continue running.

It will now be appreciated that the method described hereinabove in conjunction with FIG. 6 provides various message processing capabilities, including predictive filtering, and is compatible with most existing email servers and email clients. In particular, the method may help users reduce the number of messages in their Inbox by automatically moving certain messages to other folders.

Referring now to FIG. 7, an illustrative method 700 of training a message processing system is shown. The method described hereinbelow can be performed by a message processing server 100 and implemented within a message processing module 214 (FIG. 2). It will be appreciated by those of ordinary skill in the art that the methods illustrated in FIGS. 6 and 7 can be performed by a single processor and/or system and, further, can be performed in parallel or serially.

First, an email account record (such as record 400 in FIG. 4A) is fetched 702 from a database using a database module 210 (FIG. 2). The email account record, which is associated with an email account, may have been previously configured according to the method described above in conjunction with FIG. 5. Next, the email account record authentication tokens may be decrypted 704 and an email server session may be established 706 via a communications module 212 (FIG. 2).

Next, a folder into which a user may train messages, herein referred to as a "training folder," is selected 708. In general, any folder within the email account may be selected as a training folder and the method described herein may be repeated for several different training folders. In one embodiment, the present method may be repeated for all folders within the email account, thus allowing the user to train messages into any folder. However, it will be appreciated that some email accounts have a very large number of folders, and therefore it may be impractical to operate upon all such folders. Thus, in one embodiment, only folders associated with an importance level (as discussed above in conjunction with FIGS. 4B and 5) are selected to be training folders.

Next, the message processing server 100 may retrieve 710 a plurality of message ids within with the training folder using the communications module 212. Further, the server 100 may fetch 712 a plurality of processed message records using the database module 210, wherein each of the processed message records may have a similar structure to record 406 of FIG. 4D and a folder id associated with the training folder.

Next, the server 100 may determine 714 a plurality of trained message ids by comparing the retrieved message ids to the processed message record message ids. In one embodiment, the server can detect messages ids that are included in the retrieved messages ids but are not included in the processed message record id (i.e. messages that were copied to the training folder by a user).

Next, the message processing server 100 may retrieve 716 certain headers associated with the plurality of trained message identifiers using the communications module 212. In one embodiment, the retrieved headers include all headers that may identify the message sender, including "Sender", "From", and "Return-Path."

Next, the server 100 may create/store 718 a training record corresponding to each of the plurality of trained messages. Each training record may have the same or similar structure to record 404 of FIG. 4C. Specifically, each training record may have a "key" attribute corresponding to one of the header names and/or symbol and a "value" attribute which corresponds to one of the header values, or a derivation of one or more of the header values. In one embodiment, each training record key is "sender" and value is a combination and/or derivation of headers that may identify the message sender.

Finally, the message processing server may end 720 the session upon the email server using the communications module 212.

It will now be appreciated by those learned in the art that the method described in FIG. 7 allows a user to indirectly train the present system by moving or copying a message into a folder upon an email server and is therefore compatible with existing email servers and clients and does not require any new or special user interface.

Moreover, it should be appreciated that the systems and methods disclosed above function without needing to download, inspect, or otherwise read the body of any message and therefore provide a high level of privacy to users.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined. All references discussed and disclosed herein are hereby incorporated by reference in their entirety.

What is claimed is:

1. A method for processing electronic messages, comprising:

connecting, with an application, to an email account located upon a remote message server, wherein the email account is associated with a user;

determining one or more sent folders located upon the remote message server and associated with the email account, wherein the one or more sent folders comprise messages sent by the user;

retrieving, from the remote message server, header information for one or more sent messages located within the sent folders;

determining a recipient for each of the sent messages using the respective header information;

storing, to a database, training information comprising a mapping between one or more of the sent message recipients and importance levels, wherein the importance level associated with a given recipient is determined based upon a number of messages sent to the given recipient;

determining a source folder located upon the remote message server and associated with the email account;

retrieving, from the remote message server, header information for one or more unprocessed messages located within the source folder;

determining a sender for each of the unprocessed message using the respective header information;

determining, for at least one of the unprocessed messages, target folder located upon the remote message server using training information associated with the respective sender, wherein the database includes training information associated with the respective sender; and issuing a command to the remote message server to move the at least one unprocessed message from the source folder to the respective target folder, wherein the source folder is a different folder than the target folder.

2. The method of claim 1 further comprising:
issuing a command to the remote message server to delete one or more of the unprocessed messages from the source folder.

3. The method of claim 1 further comprising:
storing a processed message record in a database, the processed message record having a message identifier for the at least one unprocessed message and a folder identified for the target folder.

4. The method of claim 1 further comprising:
fetching a user account record from a database, the account record having a plurality of authentication tokens; and
authenticating with the message server using the plurality of authentication tokens.

5. The method of claim 4 wherein at least one of the plurality of authentication tokens is encrypted.

6. The method of claim 1 wherein connecting to an email account located upon a remote message server comprises connecting to a remote email server using Internet Message Access Protocol (IMAP).

7. The method of claim 1 further comprising:
receiving a notification from the remote message server in response to a message being delivered to the source folder.

8. The method of claim 1 further comprising:
detecting that the target folder was renamed upon the remote message server,
wherein issuing a command to the remote message server to move the at least one unprocessed message from the source folder to the respective target folder comprises issuing a command having a new target folder name.

9. The method of claim 8 wherein detecting that the target folder was renamed comprises:
fetching a plurality of folder records from a database, each folder record having a last known folder identifier;
retrieving a plurality of current folder identifiers from the remote message server, and
comparing the plurality of last known folder identifiers to the plurality of current folder identifiers.

10. The method of claim 1, further comprising:
determining that the at least one unprocessed message was moved from the target folder to a second folder located upon the remote message server; and
updating the stored training information to change the importance level associated with a sender of the at least one unprocessed message.

11. A computer system, comprising:
a microprocessor; and
an application configured to execute on the microprocessor and to:
connect, with an application, to an email account located upon a remote message server, wherein the email account is associated with a user;
determine one or more sent folders located upon the remote message server and associated with the email account, wherein the one or more sent folders comprise messages sent by the user;
retrieve, from the remote message server header information for one or more sent messages located within the sent folder;
determine a recipient for each of the sent messages using the respective header information;
store, to a database, training information comprising a mapping between one or more of the sent message recipients and importance levels, wherein the importance level associated with a given recipient is determined based upon a number of messages sent to the given recipient;
determine a source folder located upon the remote message server and associated with the email account;
retrieve, from the remote message server, header information for one or more unprocessed messages located within the source folder;
determine a sender for each of the unprocessed messages using the respective header information;
determine, for at least one of the unprocessed messages, a target folder located upon the remote message server using training information associated with the respective sender, wherein the database includes training information associated with the respective sender; and
issue a command to the remote message server to move the at least one unprocessed message from the source folder to the respective target folder, wherein the source folder is a different folder than the target folder.

12. The system of claim 11, herein the application configured to connect to an email account located upon a remote email server using Internet Message Access Protocol (IMAP).

13. The system of claim 11, wherein the application is further configured to detect that the target folder was renamed upon the remote message server.

14. A computer program product embodied on a non-transitory computer medium, the computer program product comprising instructions for:
connecting, with an application, to an email account located upon a remote message server, wherein the email account is associated with a user;
determining one or more sent folders located upon the remote message server and associated with the email account, wherein the one or more sent folders comprise messages sent by the user;
retrieving, from the remote message server, header information for one or more sent messages located within the sent folders;
determining a recipient for each of the ent messages using the respective header information;
storing, to a databases, training information comprising a mapping between one or more of the sent message recipients and importance levels, wherein the importance level associated with a given recipient is determined based upon a number of messages sent to the given recipient;
determining a source folder located upon the remote message server and associated with the email account;
retrieving, from the remote message server, header information for one or more unprocessed messages located within the source folder;
determining a sender for each of the unprocessed messages using the respective header information;
determining, for at least one of the unprocessed messages, a target folder located upon the remote message server using training information associated with the respective sender, wherein the database includes training information associated with the respective sender; and
issuing a command to the remote message server to move the at least one unprocessed message from the source folder to the respective target folder, wherein the source folder is a different folder than the target folder.

15. The computer program product of claim 14, further comprising instructions for:
detecting that the target folder was renamed upon the remote message server, wherein issuing a command to the remote message server to move the at least one unprocessed message from the source folder to the respective target folder comprises issuing a command having a new target folder name.

16. The computer program product of claim 14, further comprising instructions for:
  determining that the at least one unprocessed message was moved from the target folder to a second folder located upon the remote message server; and
  updating the stored training information to change the importance level associated with a sender of the at least one unprocessed message.

\* \* \* \* \*